(12) United States Patent
Johnson

(10) Patent No.: US 9,346,691 B2
(45) Date of Patent: May 24, 2016

(54) TUBULAR HIGH-DENSITY PLASMA REACTOR, WITH OUTER TREATMENT CHAMBER AND COLLINEAR ROTATABLE INNER CYLINDER

(75) Inventor: Derek C. Johnson, Johnstown, CO (US)

(73) Assignee: Symbios Technologies, Inc., Fort Collins, CO (US)

( * ) Notice: Subject to any disclaimer, the term of this patent is extended or adjusted under 35 U.S.C. 154(b) by 1171 days.

(21) Appl. No.: 13/107,680

(22) Filed: May 13, 2011

(65) Prior Publication Data

US 2011/0284437 A1  Nov. 24, 2011

Related U.S. Application Data

(60) Provisional application No. 61/346,795, filed on May 20, 2010.

(51) Int. Cl.

| | |
|---|---|
| *B01D 24/00* | (2006.01) |
| *B01D 33/70* | (2006.01) |
| *C02F 1/46* | (2006.01) |
| *F02M 37/22* | (2006.01) |
| *C02F 1/72* | (2006.01) |
| *C02F 1/74* | (2006.01) |
| *C02F 1/461* | (2006.01) |
| *C02F 101/30* | (2006.01) |
| *C02F 101/34* | (2006.01) |

(52) U.S. Cl.
CPC ............. *C02F 1/4608* (2013.01); *C02F 1/727* (2013.01); *C02F 1/74* (2013.01); *C02F 2001/46147* (2013.01); *C02F 2001/46166* (2013.01); *C02F 2101/306* (2013.01); *C02F 2101/34* (2013.01); *C02F 2201/003* (2013.01); *C02F 2201/4619* (2013.01); *C02F 2201/46135* (2013.01)

(58) Field of Classification Search
CPC ........ B01D 24/00; B01D 33/70; B01D 33/80; B01D 35/00; B01D 35/06; B01D 39/00; B01D 39/2062; B01D 2201/50; B01J 20/20; B01J 20/28004
See application file for complete search history.

(56) References Cited

U.S. PATENT DOCUMENTS

| | | | |
|---|---|---|---|
| 5,534,232 A | 7/1996 | Denes et al. | |
| 5,961,895 A | * 10/1999 | Sanford | ....................... 261/36.1 |
| 2004/0007539 A1 | * 1/2004 | Denes et al. | ................... 210/748 |

FOREIGN PATENT DOCUMENTS

WO    WO 2008029258 A2 *  3/2008  ............. C25B 11/12

OTHER PUBLICATIONS

Johnson et al.—Development of a tubular high-density plasma reactor for water treatment, Water Research, 40, (Jan. 2006), pp. 311-322.*

(Continued)

*Primary Examiner* — Dirk Bass
*Assistant Examiner* — Hayden Brewster
(74) *Attorney, Agent, or Firm* — Samuel M. Freund; Cochran Freund & Young LLC

(57) ABSTRACT

An apparatus and method for simultaneously removing materials from fluids without the need for added chemicals, and without the formation of toxic byproducts, by high-density plasma reaction chemistry is described. Applications to removal of contaminants, such as pesticides, organics, PPCPs, and pathogens, as examples, from water are discussed. Changes in the quality of the raw water are not expected to adversely affect the decontamination process.

3 Claims, 2 Drawing Sheets

(56) References Cited

OTHER PUBLICATIONS

MIT Dept. of Physics—Gauss's Law—Worked Examples [2002].*

Johnson, Derek C. et al., "Development of a Tubular High-Density Plasma Reactor for Water Treatment," Water Research 40 (2006), pp. 311-322.

* cited by examiner

TUBULAR HIGH-DENSITY PLASMA REACTOR, WITH OUTER TREATMENT CHAMBER AND COLLINEAR ROTATABLE INNER CYLINDER

CROSS-REFERENCE TO RELATED APPLICATIONS

The present application claims the benefit of U.S. Provisional Patent Application No. 61/346,795 for "Tubular High-Density Plasma Reactor" by Derek C. Johnson, which was filed on 20 May, 2010, the entire contents of which is hereby specifically incorporated by reference herein for all that it discloses and teaches.

FIELD OF THE INVENTION

The present invention relates generally to fluid purification and, more particularly, to purification of fluids using a high-density plasma.

BACKGROUND OF THE INVENTION

There is growing concern over the presence of contaminants such as pesticides, organic pollutants, pharmaceuticals and personal care products (PPCPs), and pathogens in source water for treatment plants, since such contaminants may pose serious negative environmental and human health effects. For example, high levels of pesticides in drinking water can cause long-term health effects, such as cancer or organ and reproductive system damage. Additionally, certain organic pollutants can also cause circulatory, nervous, reproductive and immune system deficiencies, organ damage, and cancer, which are serious long-term health effects. With respect to environmental impact, some pollutants are a nutrient for algae and result in increased rates of eutrophication, leading to reduced levels of oxygen in the water, and eventually wildlife death.

Current water treatment system components such as activated carbon, flocculation, and chlorine-based disinfection may also have harmful side effects on water quality since certain water disinfection byproducts may themselves be a cause for concern. Such problems are compounded in rural areas where contamination of source water is complicated by leaking septic tanks, pesticide and herbicide runoff from farms, and runoff of significant amounts of organic contaminants and animal waste from feedlots and ranches. Therefore the removal/inactivation of pesticides, organic pollutants, PPCP's and pathogens from drinking water systems is a priority.

Effective technology should have a minimum number of treatment steps, a minimum required amount of maintenance and oversight of the treatment process, low capital and operating costs, insensitivity of the treatment process to changing conditions or raw water quality, and ability of the treatment process to decontaminate the targeted pollutants without the formation of byproducts that are more hazardous than the parent compound.

Plasma-initiated oxidation and disinfection is considered an advanced oxidation technology and is characterized by the production of high oxidation potential species such as hydroxyl radical (.OH), hydrogen peroxide ($H_2O_2$), singlet oxygen (.O), and high-energy electrons, as examples. Such oxidizing species react readily with biological materials causing permanent damage, as well as with organic molecules, degrading them to $CO_2$, water, and inorganic salts in many cases. However, existing plasma systems have been considered to be too complicated for use with small water treatment systems in addition to requiring costly and fragile equipment and having high operation costs.

One such technology that uses a plasma as the medium in which electric energy is transferred into a liquid to degrade organic compounds and promote microbial disinfection is the dense medium plasma reactor (DMPR) described in U.S. Pat. No. 5,534,232 for "Apparatus For Reactions In Dense-Medium Plasmas" which issued to Denes et al. on Jul. 09, 1996. Liquid/vapor phase chemicals are caused to react in a low-temperature plasma. Advantages of this type of reactor, when compared with conventional plasma processing reactors, are that chemical reactions occur at atmospheric pressure and approximately room temperature, and the plasma discharge is controlled by electron flux rather than thermionic emission. The DMPR emits a higher current, continuous discharge at lower voltages than previous aqueous plasma discharge reactors, reduces mass transfer limitations inherent to non-thermal plasma reactors, and influences aspects of the chemistry occurring in and on the surface of the plasma discharges.

While the DMPR is superior to known nonthermal, plasma oxidation technologies, fluid is inefficiently cycled into the plasma zone, thereby inhibiting electron-impact dissociation reactions.

Computational fluid dynamics simulations of fluid flow in dense medium plasma reactors and experiments performed using the DMPR have been incorporated into the Tubular High-Density Plasma Reactor described in "Development Of A Tubular High-Density Plasma Reactor For Water Treatment" by Derek C. Johnson et al., Water Research 40 (2006) pages 311-322. To maximize the oxidation pathway which results in a direct conversion of organics to $CO_2$, it is proposed that the flow of contaminated liquid be made perpendicular to the plasma discharge; to decrease the voltage required to initiate the plasma from that of required for the DMPR by further lowering the pressure, gas may be introduced through the center of the discharge electrodes; and to prevent uneven wear on the discharge electrodes, which was found to be a problem for the DMPR, each electrode may have the same radial distance and thus the same angular velocity. Gas and liquid flow patterns as well as the plasma discharge path from the discharge electrodes (pins) to the outer electrically conducting cylinder through the passing contaminated aqueous solution are described in Johnson et al., supra.

The tubular high-density plasma reactor is expected to maximize the fraction of fluid in the annular gap contacting the plasma, thereby achieving an improvement over the DMPR, wherein approximately 90% of the fluid bypasses the plasma as it moves through the reaction zone.

SUMMARY OF THE INVENTION

Accordingly, it is an object of the present invention to provide an apparatus and method for removing materials from fluids.

Additional non-limiting objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for removing materials from a fluid, hereof, includes in combination: a chamber having a conducting cylindrical portion having an axis, an inlet for the fluid at one end thereof and an outlet for the fluid at the opposing end thereof; an elongated hollow, electrically conducting shaft rotatably disposed collinearly with the axis of the cylindrical portion of the chamber and having an open end and a closed end, the closed end thereof facing the end of the chamber having the inlet for the fluid; at least one conducting pin electrode having a bore therethrough, a first end and a second end, and having a frit, effective for generating bubbles, disposed in the bore in the vicinity of the first end thereof, the second end being mounted through the surface of the shaft such that the bore of the at least one pin electrode is in gaseous communication with the interior of the hollow shaft; a nonconducting cylinder having an axis collinear with the axis of the chamber and interior thereto through which a portion of the at least one pin electrode extends, the nonconducting cylinder rotating with the shaft; means for rotating the shaft; means for introducing the fluid into the inlet of the chamber such that the fluid flows axially in the cylindrical portion of the chamber; means for introducing a chosen gas into the open end of the shaft at a pressure such that gas bubbles exit through the frit of the at least one pin electrode and rise in a counter-current manner to the flow of the fluid; and means for applying a voltage to the shaft effective for initiating and maintaining a plasma discharge between the first end of the pin electrode and the interior of the conducting cylindrical portion of the chamber.

Benefits and advantages of the present invention include, but are not limited to, providing a scalable high-density plasma reactor for removing pesticides, organics, PPCPs, and pathogens, as examples, from water simultaneously, without the need for added chemicals, without formation of toxic byproducts, and with significant immunity to changes in the quality of the raw water.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
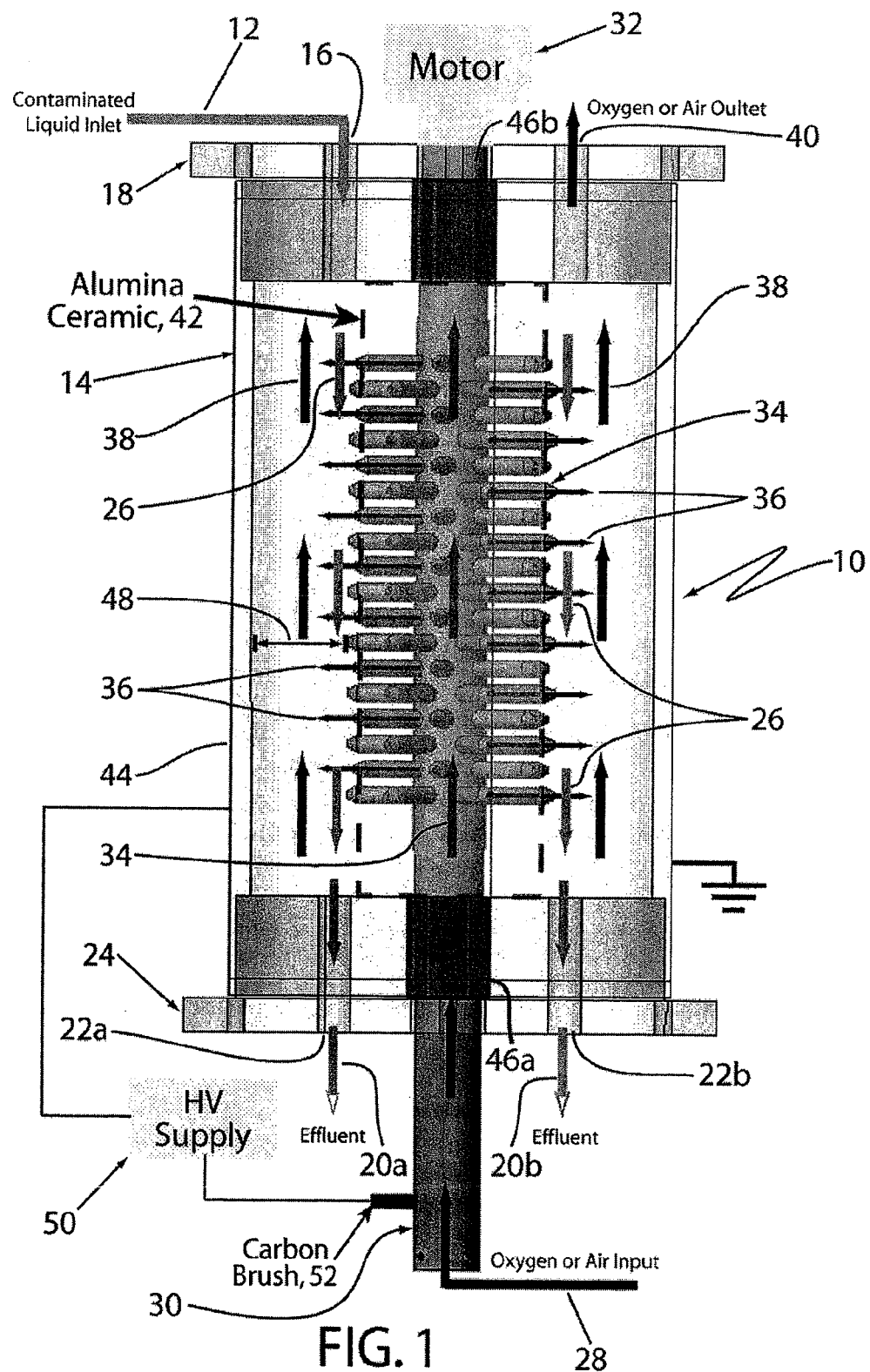
FIG. 1 is a schematic representation of a perspective view of an embodiment of the tubular high-density plasma reactor of the present invention, illustrating the fluid and gas flow and a pin electrode configuration.

Briefly, the present invention includes an apparatus and method for processing fluids using a high density plasma reactor. Reference will now be made in detail to the present embodiments of the invention, examples of which are illustrated in the accompanying drawings. In the FIGURES, similar structure will be identified using identical reference characters. Turning now to FIG. 1, a schematic representation of a perspective view of an embodiment of the tubular high-density plasma reactor, 10, of the present invention illustrates contaminated fluid, 12, entering tubular chamber or container, 14, through inlet, 16, in upper flange, 18, exiting as effluent, 20a, and, 20b, through outlets, 22a, and, 22b, respectively, in lower flange, 24, thereof, after traveling axially, 26, through tube 14. Chosen gases, 28, such as oxygen, nitrogen, argon, helium or air, as examples, are introduced into liquid 26 through hollow, rotatable, electrically conducting shaft, 30.

Shaft 30 is rotatably driven by motor, 32, and supports a chosen configuration of hollow pin discharge electrodes, 34, affixed thereto and in communication with gas 36 from gas source 28. Gas exiting, 36, from hollow pins 34 rises, 38, flowing counter-currently to liquid 26, and exits container 14 through orifice, 40, in upper flange 18, which may include a valve. The fluid being treated travels the axial length of reactor 10 and purified fluid is expelled through a liquid orifices 22a and 22b which may include release valves at the bottom of the reactor. As will be discussed hereinbelow, the gas introduction system is designed such that only a radial pressure gradient between the inner shaft and outer cylinder, thereby ensuring an equal volumetric flow rate of the gas through the bores of pin electrodes 34, independent of their position along shaft 30.

As illustrated in FIG. 1, hollow pin electrodes 34 protrude outward from shaft 30, through insulating ceramic, 42, which rotates with shaft 30, toward the outer stationary cylinder, 44, of container 14, and may be arranged such that approximately 100 discharge electrodes are disposed on a one foot length of shaft 30. Hollow pins electrodes 34 may be fabricated using stainless steel coated with tungsten or molybdenum, as examples. Motor 32 is effective for spinning shaft 30 at a rate of between 60 rpm and 2000 rpm, although a range between 0 rpm and 10,000 rpm is anticipated, on bearings, 46a, an, 46b. Gaps, 48, between the tips of discharge electrodes 34 and outer cylinder 44 can be adjusted to distances on the order of a millimeter to a few centimeters.

A plasma discharge is initiated at the outer tip of discharge electrodes 34 and propagates to the inner wall of stationary outer cylinder 44. An electrical power supply, 50, capable of supplying between 15 kV and 30 kV is expected to be effective for initiating and maintaining this discharge, and is placed in electrical connection with conducting shaft 30 using carbon brush, 52, as an example, for which the return connection to complete the circuit is in contact with stationary outer cylinder 44. Bearings 46a and 46b are insulated to ensure that neither the inner shaft nor the outer stationary cylinder becomes charged. Tubular plasma reactor 10 is expected to maximize the time in which a fluid element moving axially through the reactor is in contact with the plasma. This is accomplished by minimizing the distance that the pin electrodes protrude from insulating ceramic portion 42 of the rotating shaft 30.

Figure 2A:
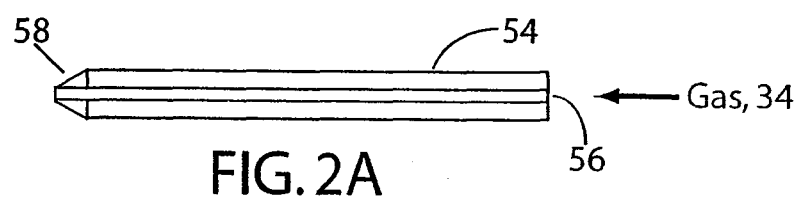
FIG. 2A is a schematic representation of the side view of an unmodified pin electrode.
Figure 2B:
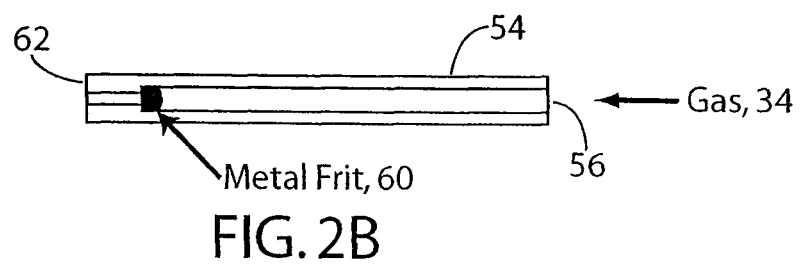
FIG. 2B is a schematic representation of the side view of a pin electrode in which a frit is inserted into the bore thereof.

FIG. 2A is a schematic representation of the side view of unmodified pin electrode, 54, having bore, 56, and tapered tip, 58, disposed at the discharge end of pin electrode 54. FIG. 2B is a schematic representation of the side view of pin electrode 54 in which frit, 60, is inserted into bore 56 in the vicinity of the discharge end, 62, thereof. Frit 60 may be a commercially available metal or glass frit having appropriate structural integrity. Equal volumetric flow rates of the gas through the bores of pin electrodes 34, independent of their position along shaft 30, may be obtained by restricting the gas flow using appropriate frits.

Figure 2C:
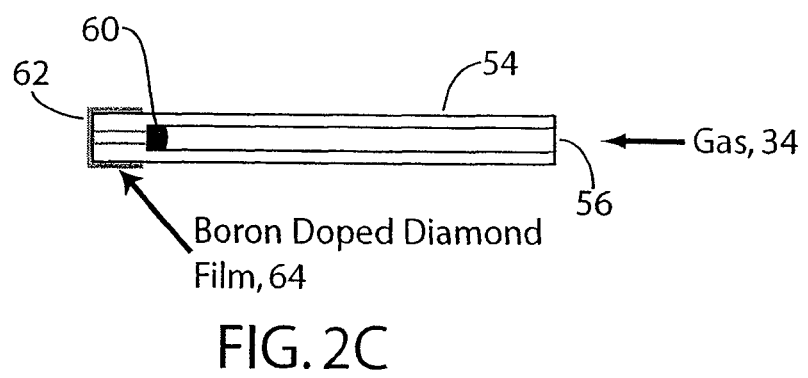
FIG. 2C is a schematic representation of the side view of the pin electrode illustrated in FIG. 2B hereof, further including a diamond film on the surface thereof.

FIG. 2C is a schematic representation of the side view of pin electrode 54 illustrated in FIG. 2B hereof, further including diamond film, 64, on the surface thereof in the vicinity of the discharge end 62 thereof. Diamond film 64 may be an undoped diamond film, or a boron-doped diamond film, as examples, and it is contemplated that other dopants may be effective for providing suitable electrical and thermal conductivity. It should be mentioned that discharge ends 60 of pin electrodes 54 illustrated in FIGS. 2B and 2C hereof may be tapered.

Returning to FIGS. 2B and 2C, metal frit 60 in bore 56 of each discharge electrode 54 is expected to distribute input gas 34 more evenly. Complementing metal frit 60 with nanoscale diamond coating 64 is expected to reduce the energy consumption and wear on the discharge electrodes. It is expected that a well dispersed introduction of gas into fluid will stabilize the plasma, increase electrode life, and promote pollutant oxidation. Micron-sized air bubbles are expected to further reduce the localized density of the fluid adjacent to the discharge electrode surface, thereby reducing the voltage required, with a consequent reduction in power consumption for initiating and sustaining the plasma. A reduction in applied voltage will reduce the total current passing through the discharge, and reduce the current density at each discharge electrode, thereby increasing electrode life. Effective diameters for frit 60 lie in the range between 0.25 in. and 0.03125 in. Effective pore sizes may be between 2 µm and 40 µm, although pore sizes in the range between less than 1 µm and 500 µm are anticipated to be useful.

Experimental evidence has indicated that diamond films reduce plasma initiation voltage, increase the emission current, and increase the lifetime of the electrodes. After incorporating the metal frit into the bore of the pin electrodes, the electrodes will be modified by depositing boron doped diamond thin films on the electrode surface which should further increase lifetime and reduce the applied voltage and power consumption. Effective film thicknesses are expected to be in the range between 50 nm and 100 nm. However, a range between 5 nm and 1 µm is expected to be useful. The diamond coating will be applied to the surface of the discharge electrode exposed to the fluid to be treated; that is, that portion protruding from the alumina ceramic. However, the film will still provide benefit if more or less of the exposed surface is coated.

It is expected that components for the present tubular high-density plasma reactor may be constructed from 316 stainless steel, alumina, aluminum, Teflon®, and polyvinyl chloride. If methyl tert-butyl ether (MTBE) is used as an organic surrogate molecule for contaminated water, data from previous experiments by the inventor and use of the mass transfer equation, a configuration of eight reactors operating in parallel, each 5 ft in length and 10 in. in diameter, is expected to treat 1 MGD (million gallons per day) of contaminated liquid.

In addition to drinking water treatment, the tubular high-density plasma reactor hereof is expected to be useful for other water treatment systems, including, but are not limited to, industrial wastewater treatment, pretreatment to reduce biofouling in reverse osmosis systems, treatment of wastewater from military forward operating bases, water treatment in disaster recovery situations, organic phosphorous removal from wastewater treatment effluent, dissolved organic carbon removal from mine drainage, treatment of halogenated compounds solvated in aqueous industrial waste streams, treatment of high BOD effluent from digesters associated with various biorefining processes, and on-site treatment of wastewater separated from oil and natural gas production wells.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for removing materials from a fluid, comprising in combination:
   a chamber for containing the fluid having an electrically conducting cylindrical wall having an axis, an inlet for introducing the fluid at one end thereof arranged such that the fluid flows axially in the cylindrical portion of the chamber, and an outlet for discharging the fluid at an opposing end thereof;
   an elongated hollow, electrically conducting shaft rotatably disposed collinearly with the axis of the cylindrical portion of the chamber and having an open end and a closed end, the closed end thereof facing the end of the chamber having the inlet for the fluid;
   at least one electrically conducting pin electrode having a bore therethrough, a first end and a second end, and having a frit, effective for generating bubbles in the fluid at the surface of the pin electrode from which a plasma discharge is generated, disposed in the bore in the vicinity of the first end thereof, the second end being mounted through the surface of the shaft such that the bore of the at least one pin electrode is in gaseous communication with the interior of the hollow shaft;
   an electrically insulating cylinder having an axis collinear with the axis of the chamber disposed within the chamber, the cylinder having a surface through which a portion of the at least one pin electrode extends, the electrically insulating cylinder rotating with the shaft;
   a motor for rotating the shaft;
   a gas source for introducing a chosen gas into the open end of the shaft at a pressure such that gas bubbles exit through the frit of the at least one pin electrode and rise in a counter-current manner to the flow of the fluid; and
   an electrical power supply for applying a voltage to the shaft effective for initiating and maintaining the plasma discharge between the first end of the pin electrode and the interior of the conducting cylindrical portion of the chamber.

2. The apparatus for removing materials from a fluid of claim 1, wherein a portion of the surface of each of said at least one pin electrodes in the vicinity of the first end thereof is coated with a diamond film.

3. The apparatus for removing materials from a fluid of claim 2, wherein said diamond film comprises a boron-doped diamond film.

* * * * *